Dec. 18, 1962  H. F. PARKER ETAL  3,068,808
POWER CHAIN GUIDE AND LOAD PICK-UP CARRIAGES AND COMPONENTS
Filed March 11, 1959  3 Sheets-Sheet 1
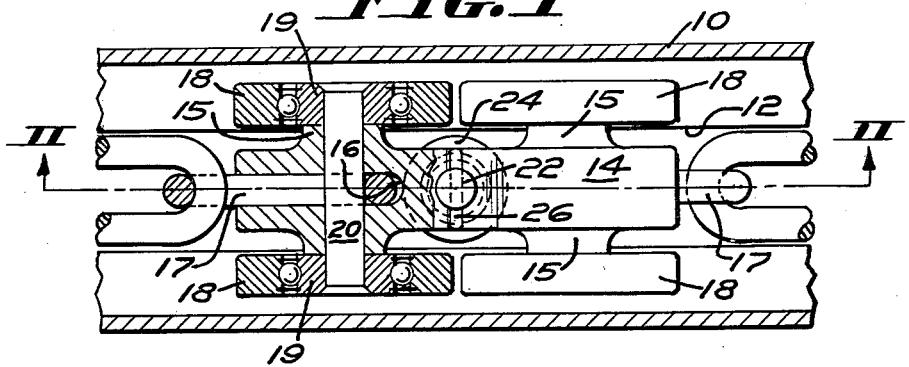
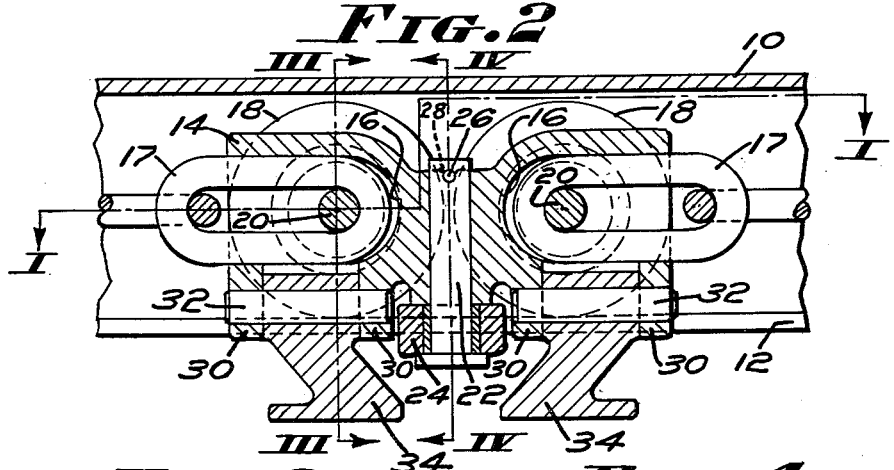
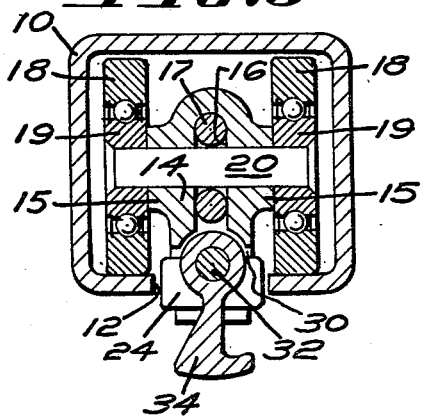
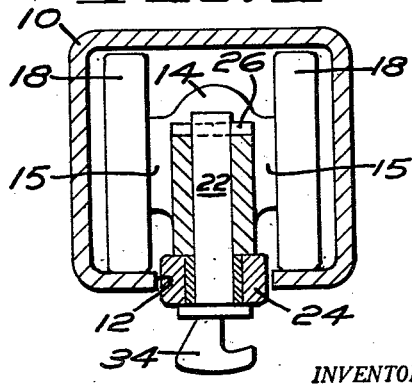
INVENTORS:
HUMPHREY F. PARKER
and ERFORD E. ROBINS
BY:
Beau, Brooks, Buckley & Beau,
ATTORNEYS.

Dec. 18, 1962 H. F. PARKER ETAL 3,068,808
POWER CHAIN GUIDE AND LOAD PICK-UP CARRIAGES AND COMPONENTS
Filed March 11, 1959 3 Sheets-Sheet 2
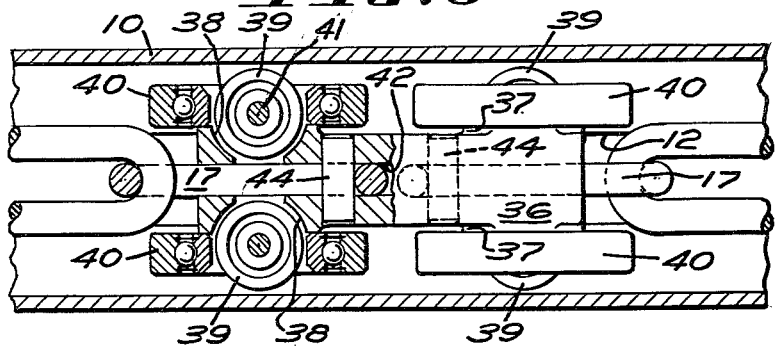
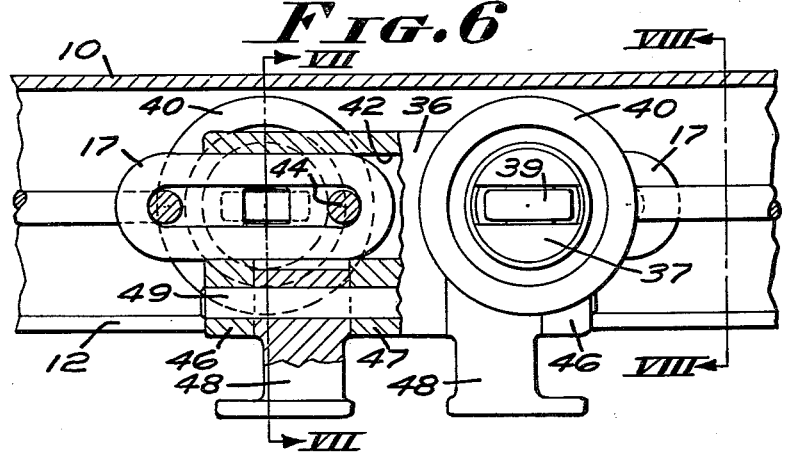
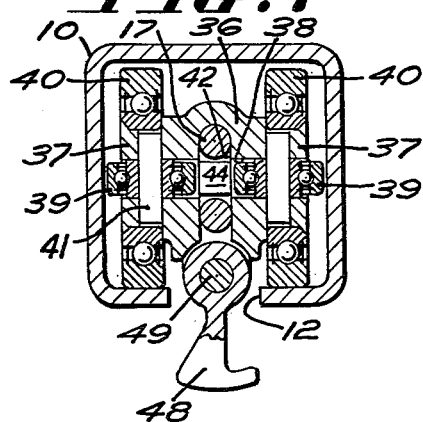
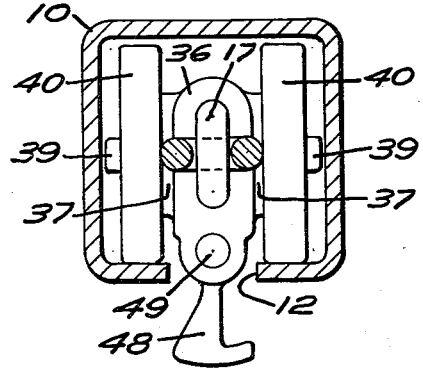
INVENTORS:
HUMPHREY F. PARKER
and ERFORD E. ROBINS
BY:
Beau, Brooks, Buckley & Beau,
ATTORNEYS

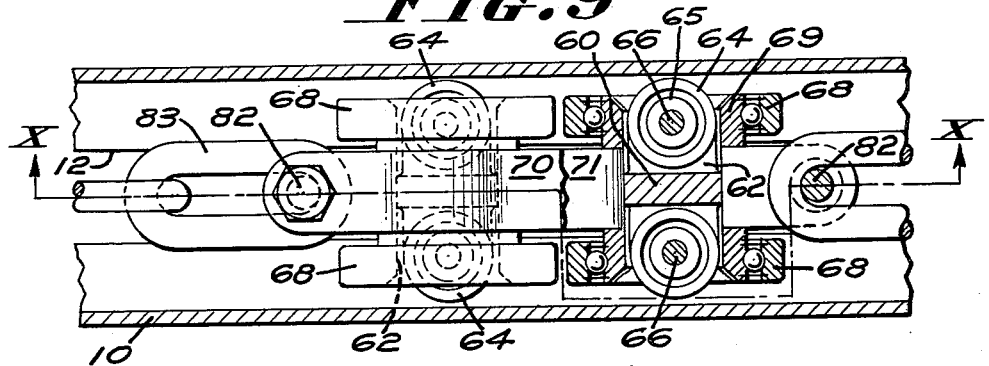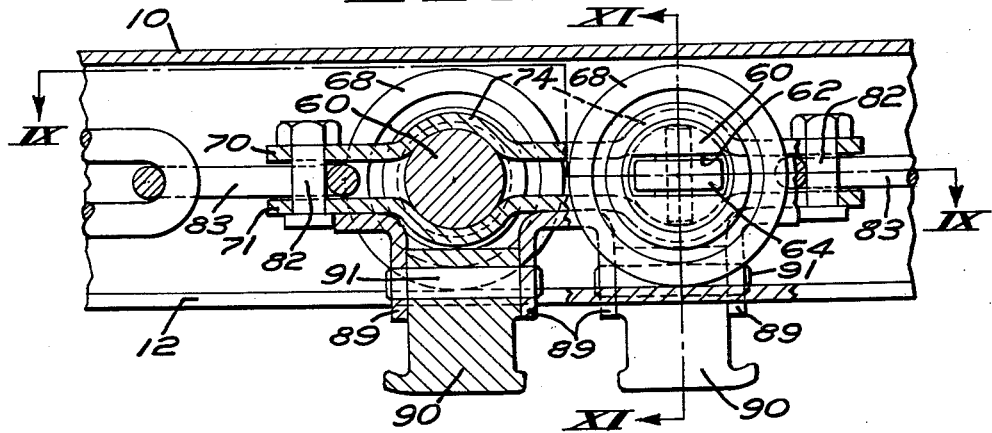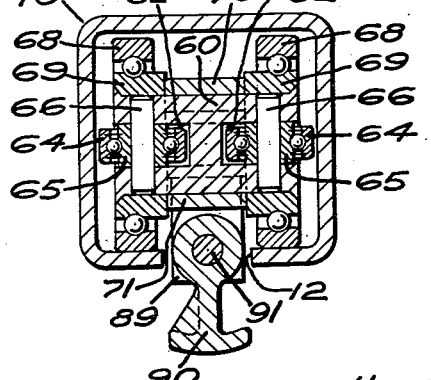

3,068,808
POWER CHAIN GUIDE AND LOAD PICK-UP CARRIAGES AND COMPONENTS
Humphrey F. Parker, Buffalo, and Erford E. Robins, North Tonawanda, N.Y., assignors to Columbus McKinnon Corporation, Tonawanda, N.Y.
Filed Mar. 11, 1959, Ser. No. 798,753
8 Claims. (Cl. 104—172)

This invention relates to chain-powered conveyors wherein power chains are provided with load pick-up or carrying means for moving hangers, trucks or other objects along trolley rails, tracks, floorways, or the like; for example, as in manufacturing or warehousing operations. The power chains referred to include wheeled drive and guide units disposed to run in a slotted track conduit to give rolling support to the power chain and drive loads by means of load pusher elements extending through the slot for engagement with load carrying trolleys or the like.

An object of the present invention is to provide an improved conveyor power chain load pick-up and guide component for use in conveyor systems as aforesaid which may be easily attached to sections of conventional welded chain.

Another object is to provide an improved power chain unit as aforesaid which is economical to manufacture and which may be easily assembled with a conveyor power chain to provide a durable power chain pick-up and guide unit.

Other objects and advantages of the invention will become apparent from the following specification, wherein the drawing illustrates various forms of the invention, and in which:

FIG. 1 is a fragmentary top plan view, partly in section, of a conveyor power chain illustrating one form of the load pick-up and guide unit of the invention;

FIG. 2 is a sectional view of the unit of FIG. 1, taken on line II—II of FIG. 1;

FIGS. 3, 4, are sectional views taken on lines III—III and IV—IV respectively of FIG. 2;

FIG. 5 is a fragmentary top plan view partly in section, showing another form of a power chain load pick-up and guide unit of the invention;

FIG. 6 is a side elevational view partly in section of the device of FIG. 5;

FIGS. 7, 8 are sectional views taken on lines VII—VII and VIII—VIII respectively of FIG. 6;

FIG. 9 is a top plan view, partly in section, of still another load pick-up and guide unit of the invention;

FIG. 10 is a side elevational view partly in section of the device of FIG. 9; and FIG. 11 is a sectional view taken on line XI—XI of FIG. 10.

Conveying systems of the type to which this invention relates include flexible power chains which may be of bent link form running in either overhead or underground trackways having load pick-up means extending from the trackway to engage load carrying hooks, racks, dollies, trolleys, or the like. For example, as shown herein the power chain supporting track is indicated at 10 to be of box-shaped cross section with the bottom wall thereof slotted as indicated at 12, so that the trackway is adapted for overhead conveyor use. However, the slot may be in the top or in either side wall of the track member, depending upon the relative position of the power chain and the work to be conveyed. The load pick-up and guide units of the invention may be interspersed throughout the length of the chain at required intervals, and the pick-up units of the present invention will function also as guide means for the power chain.

In the embodiment of the invention illustrated in FIGS. 1–4 a one-piece cast body portion 14 is provided with a pair of outwardly extending axle portions 15 at each end thereof. The body portion 14 is also provided with vertically disposed openings or slots 16—16 extending longitudinally into the body portion from each end thereof so as to accommodate vertical links 17—17 of a conventional welded link chain. Each axle portion 15 is flatted at its outer end so that when a ball bearing wheel 18 is placed thereagainst the inner race 19 thereof meets a flat mounting surface. Thus when wheels 18 are positioned at both sides of the body 14 and vertical links 17 of the power chain are slip-fitted into the slots 16, axle pins 20 may then be inserted through the openings provided through the centers of the wheels and transversely through the body and through the eyes of the power chain links, to simultaneously mount the guide wheels and to define anchor means for engaging the chain links 17 which may be inserted into the openings or slots 16—16 to secure the power chain to the carriage. Thus, there is provided a four-wheeled vertical guide carriage as an integral part of the power chain.

The body casting 14 is also centrally drilled vertically therethrough, and a headed pin 22 is disposed therein. The pin 22 carries a horizontal roller 24 at its lower end, and is held in place by any suitable means such as a retaining pin 26 which passes through an opening provided in the upper end of the pin and extends beyond both sides thereof to rest in a groove 28 in the top of the body casting 14. As shown, the horizontal roller 24 is positioned to run in the slotted portion 12 of the track, and thus will roll against the edges thereof as the carriage is subjected to sidewise displacement tendencies; and will thereby provide horizontal guiding and stabilizing of the pick-up and guide unit. As shown herein, the body casting 14 is also provided at each end with a pair of downwardly extending lugs 30. The lugs 30 are drilled longitudinally of the body casting and are thereby adapted to carry pins 32 which mount thereon load driving lugs 34 which extend through the slotted portion of the track and therebelow, and act as the load engaging means for the guide and drive unit.

In the embodiment of the invention illustrated in FIGS. 5–8 a one-piece cast body portion 36 is provided with stub-axle portions 37 extending outwardly from each side thereof at each end thereof. As shown, the axle portions are horizontally slotted at 38 to accommodate horizontally disposed rollers 39, while vertically disposed rollers 40 are mounted over the ends of the axle portions 37. The rollers 39 are conveniently carried by pins 41 (FIGS. 5, 7) which are held in assembled relation by the inner races of rollers 40, and the outer ends of the axle portions 37 are peened as shown in FIG. 7 to hold the rollers 40 in place, thus completing the assembly. The cast body 36 is provided with a vertically oriented opening or slot 42 running longitudinally through the center of the body. The slot 42 is dimensioned to receive in slide-fitting relation vertical links 17 of a welded link chain, and the body is transversely drilled so as to intersect the slot 42 and to receive anchor means in the form of pins 44 inserted therethrough after the vertical links are positioned as shown. Thus, the pins 44, 44 lock the vertical links 17 to the carriage body, and thereby render it an integral part of the power chain assembly.

As shown, the body 36 is provided with downwardly extending lugs 46 at each end thereof, and a centrally disposed downwardly extending lug 47, all of which are drilled longitudinally of the carriage body and permit the mounting of a pair of load engaging driving lugs 48, 48 thereon, as by means of a single pivot pin 49 which press-fits through the openings in the downwardly extending lugs and through aligned openings provided in the driving lugs 48. As in the first embodiment of the invention shown, this construction provides a four-wheeled driving and guiding carriage which functions as an integral part of the power chain.

The embodiment of the invention illustrated in FIGS. 9–11 utilizes a pair of axle and wheel assemblies wherein each single axle member or portion 60 of the body portion has mounted thereon at each end thereof a horizontally disposed guide wheel 64 within a vertically disposed guide wheel 68, as in the case of FIGS. 5–8. The structure of FIGS. 9–11 utilizes as a basic unit the axle portion or member 60 which is horizontally slotted at each end thereof as indicated at 62 and is drilled vertically therethrough near each end thereof to intersect the slotted portions 62. Horizontal guide wheels 64 are disposed in the axle slots, and are mounted for rotation therein by pins 66 fitted into the bores drilled vertically through the axle portion or member 60. The vertically disposed guide wheels 68 are then fitted over each end of the axle to provide vertical rolling support and incidentally retain the pins 66 in position. The outer ends of the inner races 69 of the vertical wheels 68 are beveled at their inner perimeters so that after assembly upon the axle, the ends of the axle may be spun or peened outwardly to fill the beveled area and thereby lock the vertical wheels in position.

Thus the body portion of the drive and guide unit such as shown in FIGS. 9–11 may be fabricated by joining a pair of the axle-wheel basic assemblies as described hereinabove, by means of a pair of cooperating strap members 70, 71 having arcuate offset portions 74 to accept and retain the axle assemblies at the centers thereof. The straps extend beyond the axles at each end of the body of the guide unit and are disposed in spaced apart relationship to define an opening or slot therebetween and are bored at the ends thereof to accommodate anchor bolts 82 for the purpose of locking the straps to the axles and furnishing anchor means for the connecting links 83 of the power chain which may be inserted into the openings or slots between the strap members 70—71. Downwardly extending brackets for mounting load engaging or pick-up lugs are readily provided by welding or otherwise attaching to the lower strap 71 bent metal pieces as indicated at 89. The vertical legs of the brackets are drilled to pivotally mount the driving lugs 90, by means of pins 91. Thus, the body of the unit is formed by a pair of axle members and the cooperating strap members 70, 71 serving to integrate the assemblage.

Thus it will be appreciated that the carriage constructions of the present invention are simple in design and rugged in construction and adapted to be manufactured and assembled of a relatively few number of parts such as may be inexpensively made by standard shop practices.

Also it will be appreciated that whereas only a few forms of the invention have been illustrated and described in detail hereinabove, it will be understood that various changes may be made therein without departing from the spirit of the invention or the scope of the following claims.

We claim:

1. A load pick-up and guide unit for articulated connection with components of a conveyor power chain of bent link form, said unit comprising a body having axle means extending from opposite sides thereof in longitudinally spaced relation to each other, the front and rear end portions of the body being slotted to accommodate insertion of chain links in anchored relation therein, vertical guide wheels rotatably mounted upon said axle means, and horizontal guide wheel means carried by said body.

2. A load engaging and guide unit for articulated connection with components of a conveyor power chain, said unit comprising an elongate body portion having axle portions extending from opposite sides thereof in longitudinally spaced relationship relative thereto, the front and the rear end portions of the body portion each being open to accommodate the insertion of a chain link thereinto, transversely disposed anchor means for engaging such inserted chain links in articulated connection relation, guide wheels rotatably mounted on said body portion, and load engaging means extending from said body portion.

3. A guide unit for articulated connection with components of a conveyor power chain, said unit comprising an elongate body portion having a pair of axle portions extending therefrom in longitudinally spaced relationship relative thereto with the opposed end portions of the body portion each being open to accommodate the insertion of a chain link thereinto, anchor means disposed within the confines of the opening in each end portion of the body portion for engaging such inserted chain links in articulated connection relation, and guide wheels rotatably carried by the body portion of the unit.

4. In combination with a conveyor power chain of bent link form, a load engaging and guide unit for articulated connection with components of the conveyor power chain, said unit comprising an elongate body portion having a pair of axle portions extending from opposite sides thereof in longitudinally spaced relationship relative thereto with the opposed end portions of the body portion each being open to accommodate the insertion of a chain link of the power chain thereinto, anchor means projecting through each of the openings in the end portions of the body portion for engaging the inserted chain link of said power chain, guide wheels rotatably carried by said body portion, and load engaging means extending from the body portion of the unit.

5. A load engaging and guide unit for articulated connection within a conveyor power chain, said unit comprising an elongate body portion having a pair of axle pins extending from opposite sides thereof in longitudinally spaced relationship relative to the body portion, the front and the rear end portions of the body portion being open to accommodate power chain links therein with said axle pins projecting therethrough to define anchor means for engaging such chain links, a pin extending vertically through the central portion of said body portion and terminating therebelow, a horizontal guide roller carried by the bottom end portion of said pin, guide wheels carried by the end portions of said axle pins, and load engaging means depending pivotally from said body portion of the unit.

6. A guide unit for articulated connection in a conveyor power chain, said unit comprising an elongate body portion having axle portions extending integrally from opposite sides thereof in longitudinally spaced relationship relative thereto, the front and the rear end portions of the body portion being slotted to accommodate power chain links therein, anchor means transversely disposed within the slotted end portions of the body portion for articulated connection with such chain links, and vertical and horizontal guide wheels mounted upon the extending end portions of each of the axle portions.

7. A load engaging and guide unit for articulated connection in a conveyor power chain, said unit comprising
a body portion defined by a pair of elongate strap members clamped upon a pair of longitudinally spaced apart axle members with the front and rear end portions of the strap members extending beyond the respective axle members and spaced apart relative to each other to define therebetween an opening to accommodate links of a power chain,
transversely disposed anchor means interconnecting said front and said rear end portions of the strap members and for engaging such chain links,
wheel means mounted upon the ends of said axle members, and
load engaging means extending from at least one of said strap members.

8. A guide unit for articulated connection within a conveyor power chain, said unit comprising
a body portion including a pair of elongate strap members clamped upon opposite sides of a pair of axle members,
said axle members extending from opposite sides of the strap members and disposed in longitudinally spaced relationship relative to the body portion,
the front and the rear end portions of the strap members being spaced apart to define an opening therebetween to accommodate connecting links of a power chain,
anchor means interconnecting the spaced apart end portions of said strap members and for engaging such chain links, and
guide wheels mounted upon the ends of each of said axle members.

References Cited in the file of this patent

UNITED STATES PATENTS

| | | |
|---|---|---|
| 2,725,973 | King | Dec. 6, 1955 |
| 2,879,715 | Bolin | Mar. 31, 1959 |
| 2,981,203 | Parker et al. | Apr. 25, 1961 |

FOREIGN PATENTS

| | | |
|---|---|---|
| 738,491 | Germany | Aug. 18, 1943 |
| 463,392 | Great Britain | Mar. 30, 1937 |